US011288241B1

United States Patent
Merritt et al.

(10) Patent No.: US 11,288,241 B1
(45) Date of Patent: *Mar. 29, 2022

(54) SYSTEMS AND METHODS FOR INTEGRATION AND ANALYSIS OF DATA RECORDS

(71) Applicant: MASSACHUSETTS MUTUAL LIFE INSURANCE COMPANY, Springfield, MA (US)

(72) Inventors: Sears Merritt, Groton, MA (US); Thom Neale, Bedford, MA (US)

(73) Assignee: MASSACHUSETTS MUTUAL LIFE INSURANCE COMPANY, Springfield, MA (US)

( * ) Notice: Subject to any disclaimer, the term of this patent is extended or adjusted under 35 U.S.C. 154(b) by 202 days.

This patent is subject to a terminal disclaimer.

(21) Appl. No.: 16/580,955

(22) Filed: Sep. 24, 2019

Related U.S. Application Data

(63) Continuation of application No. 15/380,925, filed on Dec. 15, 2016, now Pat. No. 10,467,201.

(60) Provisional application No. 62/387,164, filed on Dec. 23, 2015.

(51) Int. Cl.
| | |
|---|---|
| G06F 16/00 | (2019.01) |
| G06F 16/21 | (2019.01) |
| G06F 16/215 | (2019.01) |
| G06F 16/25 | (2019.01) |
| G06F 16/28 | (2019.01) |
| G06F 16/901 | (2019.01) |

(52) U.S. Cl.
CPC .......... G06F 16/212 (2019.01); G06F 16/215 (2019.01); G06F 16/258 (2019.01); G06F 16/285 (2019.01); G06F 16/9024 (2019.01)

(58) Field of Classification Search
CPC .... G06F 16/212; G06F 16/285; G06F 16/215; G06F 16/258; G06F 16/9024
See application file for complete search history.

(56) References Cited

U.S. PATENT DOCUMENTS

| 7,657,540 B1 | 2/2010 | Bayliss | |
|---|---|---|---|
| 2010/0125545 A1* | 5/2010 | Navas | G06F 16/2255 707/602 |
| 2013/0173560 A1 | 7/2013 | McNeill et al. | |
| 2013/0212103 A1* | 8/2013 | Cao | G06F 16/215 707/737 |
| 2014/0330845 A1 | 11/2014 | Feldschuh | |
| 2015/0032756 A1 | 1/2015 | Sigler | |
| 2015/0254308 A1 | 9/2015 | Scott et al. | |
| 2015/0269494 A1 | 9/2015 | Kardes et al. | |
| 2016/0004937 A1* | 1/2016 | Kurzer | G06F 16/90344 382/229 |
| 2018/0052904 A1* | 2/2018 | Fusco | G06F 16/24578 |

* cited by examiner

*Primary Examiner* — Khanh B Pham
(74) *Attorney, Agent, or Firm* — Foly & Lardner LLP

(57) ABSTRACT

Methods and systems for determining relationships between two or more nominally unrelated data sources utilizing a combination of probabilistic modeling and graphical clustering are described. The systems and methods for utilizing probabilistic model functions as a way of determining and judging the likelihood that two records from different systems are related to the same entity.

20 Claims, 10 Drawing Sheets

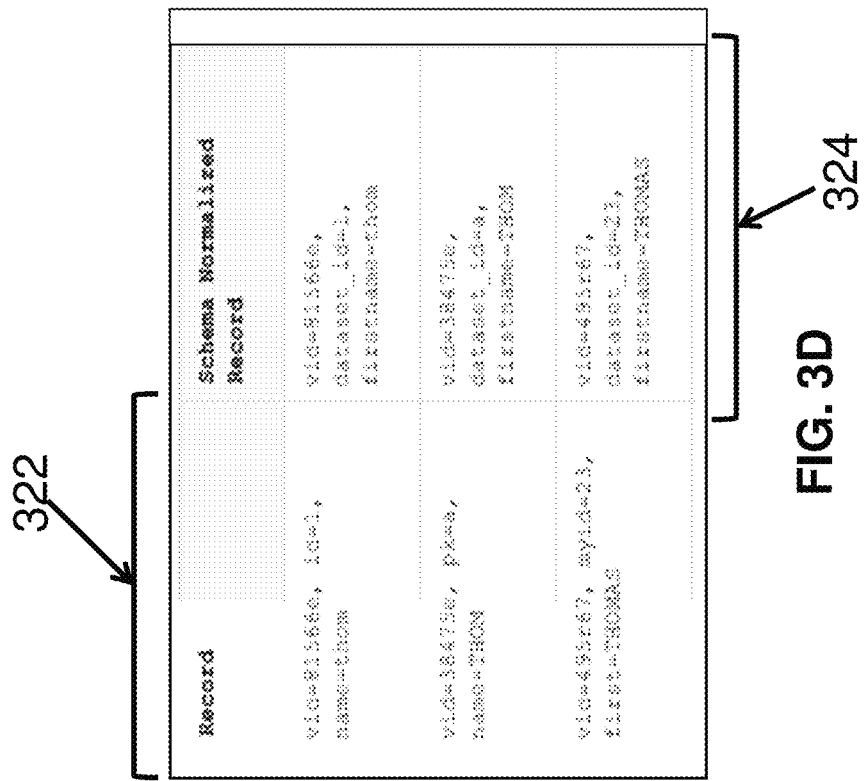

SYSTEMS AND METHODS FOR INTEGRATION AND ANALYSIS OF DATA RECORDS

CROSS-REFERENCE TO RELATED APPLICATION

This application is a continuation of U.S. patent application Ser. No. 15/380,925, filed on Dec. 15, 2016, which claims priority to U.S. Provisional Patent Application Ser. No. 62/387,164, filed on Dec. 23, 2015, which are hereby incorporated by reference in their entirety.

TECHNICAL FIELD

The present disclosure relates to systems and methods for integration and analysis of data records.

BACKGROUND

As the processing power of computers allow for greater computer functionality and the Internet technology era allows for interconnectivity between computing systems, more records of data are generated, stored, maintained, and queried every day. As a result, the size and number of datasets and databases available continues to grow and expand exponentially. The datasets and records within these databases may be generated in a variety of ways, from a variety of related or unrelated sources. Furthermore, the datasets and records may be generated at different times, and stored in different formats and locations. As a result, problems occur when users try to query large seemingly unrelated datasets because the relationships between the data records stored in the unrelated databases and records may not be obvious since the records may be stored in different formats or related to different entities and subject matters that do not share common identifiers.

Conventionally, querying different datasets has been accomplished using a "brute force" method of analyzing all datasets and databases. Existing and conventional methods fail to provide fast and efficient analysis due to a high volume of data existing on different networks and computing infrastructures. Managing and organizing such data on different platforms is difficult due to number, size, content, or relationships of the data within a database. Furthermore, existing and conventional methods consume a large amount of computing power, which is not ideal.

SUMMARY

For the aforementioned reasons, there is a need for a more efficient and faster system and method for processing large databases, which would determine relationships between different data points and datasets in a more efficient manner than possible with human-intervention or conventional computer data-driven analysis. There is a need for methods and systems to determine relationships between large seemingly unrelated datasets such that the end result is a new dataset that enables the originally unconnected datasets to be queried as though they contains foreign key references that all point back to a single unified set of entities. These features allow performing large work such as time-consuming analysis and/or querying different datasets in a more efficient manner by using less computing power than other approaches. The methods and systems disclosed may be implemented using a modular set of sub-systems and instructions that each perform a step of the computation required to scale up the linking of billions of pairs of records. The sub-systems may include preprocessing, blocking, classification and graphical analysis. Each of these sub-systems may comprise one or more sub-steps to complete the sub-system. For example, preprocessing may include converting the data sets to the same type of character encoding and applying a schema normalization step.

The methods and systems of the present disclosure may improve performance and speed of current databases systems by determining probabilistic relationships between sets of apparently disparate data that might exist in multiple databases and datasets. In this manner, the methods and systems of the present disclosure may improve the performance of current database management systems because it enables the searching of multiple apparently unrelated databases using a single series of queries. By determining the probability of the relationship between various data in various datasets allows for improved, speed, and performance to the relationship established utilizing the present disclosure.

In one embodiment, during the preprocessing step, a server execute instructions to convert every input record into the format required by a final database tables produced by the method as a whole. To accomplish this, the records must undergo a schema normalization step in which semantically equivalent fields are identified so that a blocking function can uniformly access attributes from each record without regard to idiosyncrasies of column naming in each dataset. After schema normalization, blocking serves to reduce the total number of pairwise comparisons of records in all input datasets, to one requiring a much smaller number of pairwise comparisons. Once the records have been grouped into blocks, the records within each block may be compared on a pairwise basis to determine which are related. The systems and methods described herein then analyzes a classified block pairs as a graph structure in order to cluster the linked records into groups representing distinct entities. The connected components of the graph structure are then computed, and each is assigned a unique ID. The connected component IDs may be then joined with the original input datasets and function as a unique entity ID that all input records will reference. The entities can then be used to join records across datasets based on the underlying linked entity table created during the linkage process.

In another embodiment, a system comprises a first and second database configured to store a plurality of data points, and a server. The server is configured to convert the plurality of data points stored in the first database associated with a first format and the second database associated with a second format, to a common format in a single dataset wherein the plurality of data points are arranged in a plurality of fields. The server is further configured to, upon converting the plurality of data points to the common format, assign a unique id to each field of the plurality of data points. The server is further configured to normalize the plurality of data points arranged in the plurality of fields by applying a master schema, wherein the master schema identifies each semantically equivalent field. The server is further configured to group, based on a blocking key, to produce a hashable value for the converted plurality of data points into one or more groups upon the converted plurality of data points satisfying a first pre-defined criteria, wherein the blocking key utilizes a by-key aggression technique. The server is further configured to match the one or more groups with each other based on a relationship corresponding to the hashable value associated with each group satisfying a second pre-defined criteria. The server is further configured to generate a graph comprising the classification data comprising a set of vertices, wherein each vertex is represented as a unique long integer and a set of edges in an undirected graph, wherein an edge associated with each vertix corresponds to each matched group. The server is further configured to store the relationships between the grouped data with the unique id in a third database.

In another embodiment, a computer-implemented method comprises converting, by a server, a plurality of data points stored in a first database associated with a first format and a second database associated with a second format, to a common format in a single dataset wherein the plurality of data points are arranged in a plurality of fields. The computer-implemented method further comprises upon converting the plurality of data points to the common format, assigning, by the server, a unique id to each field of the plurality of data points. The computer-implemented method further comprises normalizing, by the server, the plurality of data points arranged in the plurality of fields by applying a master schema, wherein the master schema identifies each semantically equivalent field. The computer-implemented method further comprises grouping, by the server, based on a blocking key, to produce a hashable value for the converted plurality of data points into one or more groups upon the converted plurality of data points satisfying a first pre-defined criteria, wherein the blocking key utilizes a by-key aggression technique. The computer-implemented method further comprises matching, by the server, the one or more groups with each other based on a relationship corresponding to the hashable value associated with each group satisfying a second pre-defined criteria. The computer-implemented method further comprises generating, by the server, a graph comprising the classification data comprising a set of vertices, wherein each vertex is represented as a unique long integer and a set of edges in an undirected graph, wherein an edge associated with each vertix corresponds to each matched group. The computer-implemented method further comprises storing, by the server, the relationships between the grouped data with the unique id in a third database.

Numerous other aspects, features and benefits of the present disclosure may be made apparent from the following detailed description taken together with the drawing figures.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

FIGS. 3C and 3D are examples of an implementation preprocessing process executed by a server of data records integration system, according to an exemplary embodiment.

DETAILED DESCRIPTION

Figure 1A:
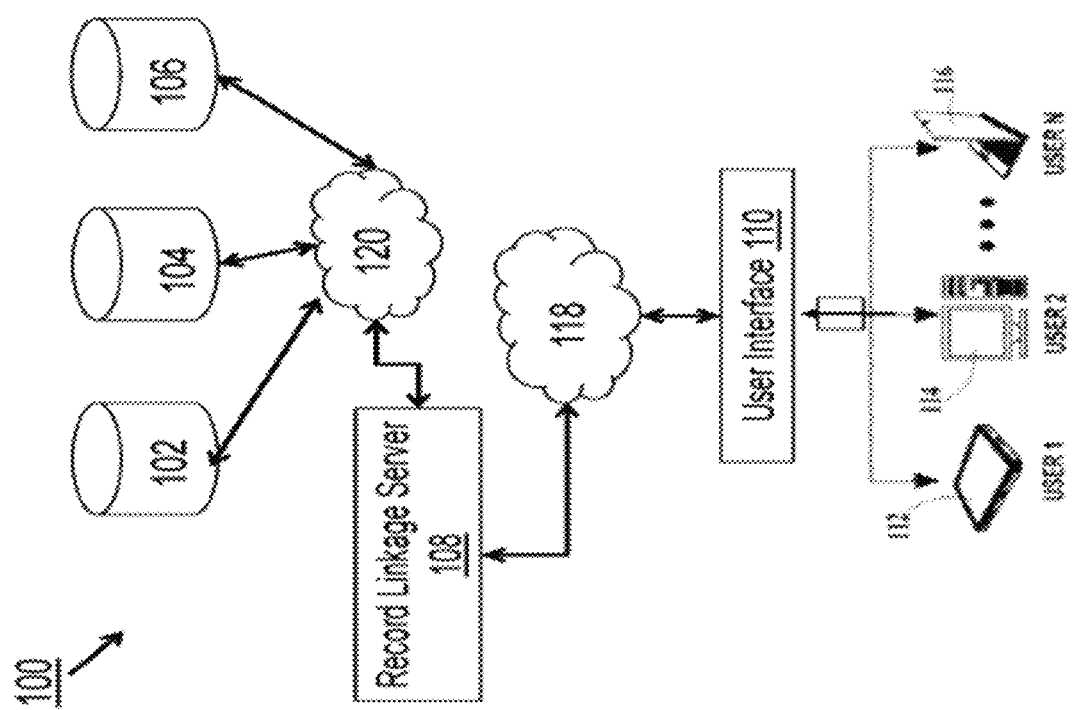
FIG. 1A is a block diagram illustrating an architecture for data records integration system, according to an exemplary embodiment.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

The systems and methods for determining relationships between records are disclosed. The methods may include the preprocessing, blocking, classifying and graphing of data records to identify probabilistic relationships between seemingly unrelated records. In an embodiment, the systems and methods aim to be a scalable probabilistic record linkage strategy implemented atop a cluster-computing system designed to parallelize computationally expensive operations over large amounts of data such as on an Apache Spark network.

FIG. 1A is a block diagram illustrating an architecture for data records integration system 100, according to an exemplary embodiment. In FIG. 1, the data records integration system 100 may include database 102, database 104, database 106, record linkage server 108 (hereinafter server 108), user interface 110, computing devices 112, 114, and 116, and communication networks 118 and 120. The data records integration system 100 may include one or more of additional servers (not shown) having necessary hardware and software to implement any of the aforementioned data records integration system 100 components that require implementation via such necessary hardware and software, among others. It should be understood that the data records integration system 100 may include less components, more components, or different components depending on the desired analysis goals.

In some embodiments, the server 108 may be implemented as computer hardware and software comprising any number of components required for running a desired set of applications, including any number of processors, random access memory modules, physical storage drives, wired communication ports, wireless communication ports, and the like. The server 108 may be configured to work with massive sets of data and/or data points, and includes any number of software tools and analytics engine manager(s). The software tools and analytics engines may be software modules running on a hardware within the server 108. The hardware may be computing devices that may communicate using network infrastructure such as the communication networks 118 and 120. The examples of computing devices may include personal computers, tablet devices, and mobile phones, among others. The examples of the communication networks 118 and 120 may include intranets, personal networks, local area networks (LAN), wide area networks (WAN) such as the internet, storage area networks (SAN), virtual private networks (VPN), wired or wireless networks, and the world wide web, amongst others.

In some embodiments, the databases 102, 104 and 106 may be implemented using database management systems (DBMS). The examples of the DBMS may include but not limited to MySQL, PostgreSQL, SQLite, Microsoft SQL Server, Microsoft Access, Oracle, SAP, dBASE, FoxPro, IBM DB2, LibreOffice Base, FileMaker Pro and any other type of database that organizes collections of data. The databases 102, 104 and 106 may store data and/or data points related to users, entities, products, or any other type of data. The data points/information stored within the databases 102, 104 and 106 may be derived from internal and/or external sources. In some embodiments, the database 106 may constitute a new dataset that enables the originally unconnected databases 102 and 104 to be queried as though the databases 102 and 104 contain foreign key references that point back to a single unified dataset. It is to be understood by a person with ordinary skill in the art that the databases 102, 104 and 106 may be physically unique and separate databases or may be parts of a single physical database without moving out from the scope of the disclosed embodiments.

In some embodiments, users may interact with the data records integration system 100 via the computing devices 112, 114 and 116. The users (user 1 to user n) of the computing devices 112, 114 and 116 may interact with one or more components within the data records integration system 100 via the user interface 110. The examples of such computing devices include personal computers, tablet devices, and mobile phones, amongst others. In some embodiments, the user interface 110 may be configured to allow the users (user 1 to user n) of the computing devices 112, 114 and 116 to interact with the server 108 in accordance with methods of the present disclosure.

Figure 1B:
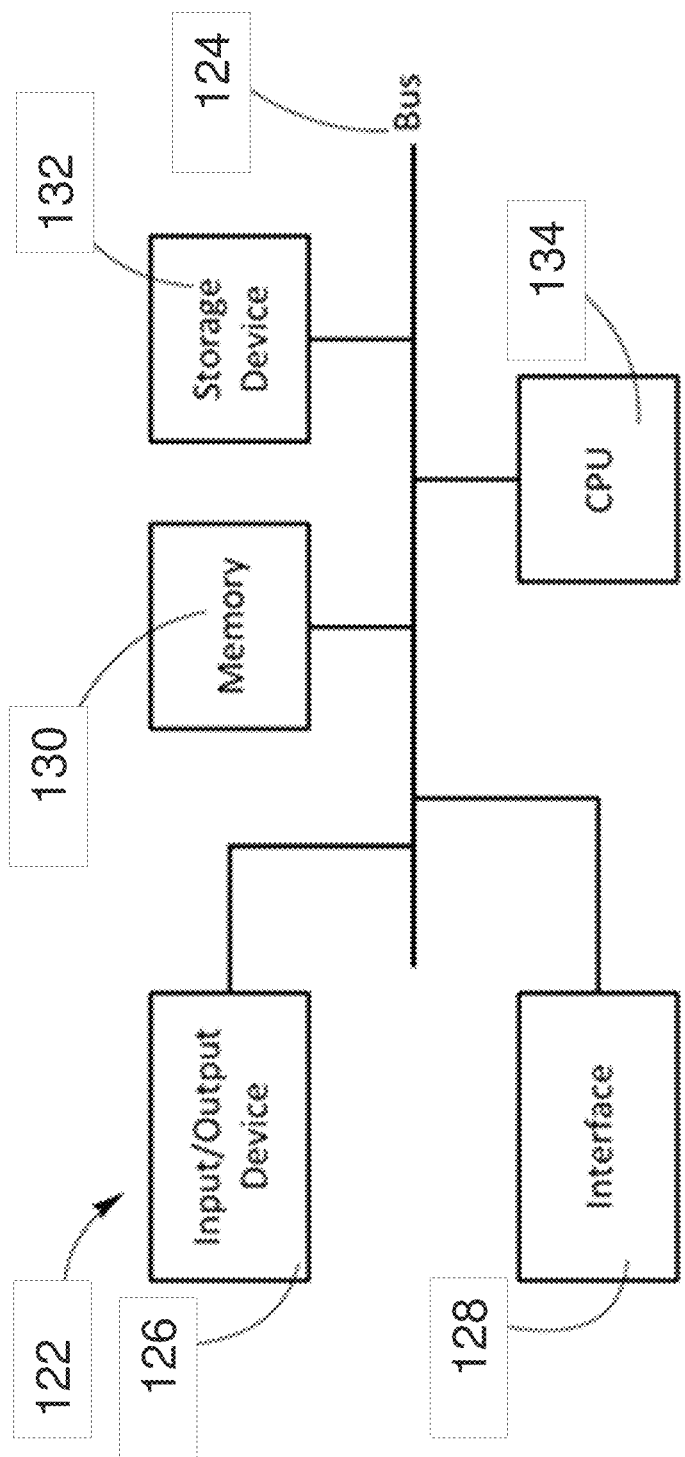
FIG. 1B is a block diagram showing components of an exemplary data records integration system to, according to an exemplary embodiment.

FIG. 1B is a block diagram 122 showing components of an exemplary data records integration system 100, according to an exemplary embodiment. A bus 124 is in physical communication with I/O device 126, a communication interface 128, a memory 130, a storage device 132, and a central processing unit 134. The bus 1002 includes a path that permits components within a computing device to communicate with each other. Examples of the I/O device 126 include peripherals and/or other mechanism that may enable a user to input information to the computing device, including a keyboard, computer mice, buttons, touch screens, voice recognition, and biometric mechanisms, and the like. The I/O device 126 also includes a mechanism that outputs information to the user of the computing device, such as, for example a display, a light emitting diode (LED), a printer, a speaker, and the like.

Examples of the communication interface 128 include mechanisms that enable the computing device to communicate with other computing devices and/or systems through network connections. Examples of the network connections include connections between computers, such as, for example intranets, local area networks (LANs), virtual private networks (VPNs), wide area networks (WANs), the Internet, and the like. Examples of the memory 130 include random access memory (RAM), read-only memory (ROM), flash memory, and the like. Examples of the storage device 132 include magnetic and/or optical recording medium, ferro-electric RAM (F-RAM) hard disks, solid-state drives, floppy disks, optical discs, and the like. In some embodiments, the memory 130 and the storage device 132 store information and instructions for execution by the central processing unit 134. In some embodiments, the central processing unit 134 includes a microprocessor, an application specific integrated circuit (ASIC), or a field programmable object array (FPOA), and the like. In some embodiments, the central processing unit 134 interprets and executes instructions retrieved from the memory 130 and the storage device 132.

In some embodiments, the computing device is implemented as part of the server 108, analytics engine, and the like. Examples of these implementations include servers, authorized computing devices, smartphones, desktop computers, laptop computers, tablet computers, PDAs, another type of processor-controlled device that may receive, process, transmit digital data, and the like. Additionally, computing device may perform certain operations that are required for the proper operation of system architecture 100. Computing devices may perform these operations in response to central processing unit 134 executing software instructions contained in a computer-readable medium, such as memory 130.

In some embodiments, the software instructions of the system architecture 100 are read into the memory 130 from another memory location, such as the storage device 132, or from another computing device (e.g., database, and the like) via communication interface 128. In some embodiments, the software instructions contained within the memory 130 instruct the central processing unit 134 to perform processes described in FIGS. 2-7. Alternatively, hardwired circuitry may be used in place of or in combination with software instructions to implement processes described herein. Thus, implementations described herein are not limited to any specific combination of hardware circuitry and software.

Figure 2:
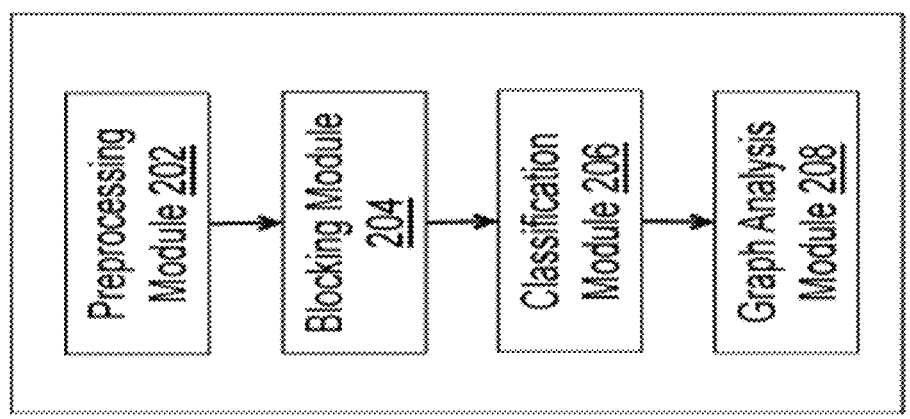
FIG. 2 is a block diagram illustrating components of a server of data records integration system executing a process for integration of data records, according to an exemplary embodiment.

FIG. 2 is a block diagram illustrating components of a server 200 of data records integration system executing a process for integration of data records, according to an exemplary embodiment. FIG. 2 will be explained in conjunction with FIGS. 1A and 1B. In order to integrate the data records, a record linkage server (hereinafter server 200) for a probabilistic data records integration system identifies relations among data records from two or more nominally unrelated data sources through a combination of probabilistic modeling and graphical clustering.

In some embodiments, the server 200 may include and/or execute a preprocessing module 202, a blocking module 204, a classification module 206 and a graph analysis module 208. In some embodiments, the server 200 may include fewer, additional, different, or differently configured components than those shown in FIG. 2.

In some embodiments, the server 200 may be implemented as computer hardware and software configured to run a desired number of software modules and to connect to other components in a data records integration system architecture, such as, for example, a data records integration system architecture 100 of FIGS. 1A and 1B. The server 200 may be implemented as one or more components/elements/functions contained within a computing device. In some embodiments, the preprocessing module 202, the blocking module 204, the classification module 206 and the graph analysis module 208 may be implemented as individual software modules running on hardware associated with the server 200 of the data records integration system. In some embodiments, one or more of the modules including but not limited to the preprocessing module 202, the blocking module 204, the classification module 206 and the graph analysis module 208 may be implemented as software modules able to perform multiple tasks associated with two or more of the aforementioned modules to execute the process for integration of data records.

Figure 3A:
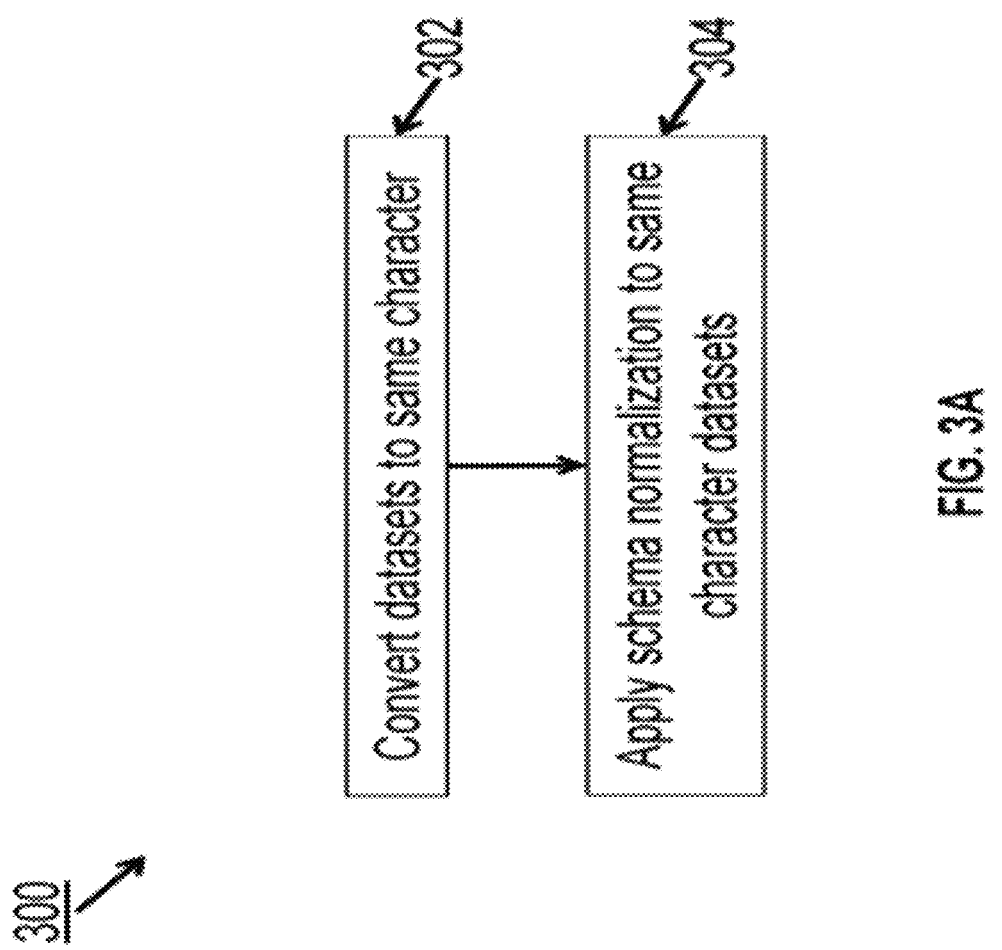
FIG. 3A illustrates a flow diagram showing preprocessing process executed by a server of data records integration system, according to an exemplary embodiment.

FIG. 3A illustrates a flow diagram showing preprocessing process 300 executed by a server of data records integration system, according to an exemplary embodiment. FIG. 3A will be explained in conjunction with FIG. 1A-1B and FIG. 2. In some embodiments, a preprocessing module within a record linkage server (hereinafter server) or executed by the server performs preprocessing of datasets in two or more databases. The preprocessing may include, at step 302, converting the datasets to a same character encoding by the server, and subsequently, at step 304, applying by the server a schema normalization step to enable fields required in blocking and classification steps of a process for integration of data records to be accessed using a same set of field names across all the input datasets.

During operation of the data records integration system, the preprocessing module of the server may receive instructions to convert every input record stored in two or more databases (for example, databases 102 and 104 of FIG. 1A) into a format required by a final database (for example, database 106 of FIG. 1A) tables produced by the server. In some embodiments, the final database (for example, database 106 of FIG. 1A) may have at least one entity table—representing people, for example—and two or more tables containing foreign key references that relate back to the entity table.

In some embodiments, on receiving one or more instructions by the server, all the data in the databases (for example, databases 102 and 104 of FIG. 1A) may be converted by the server to a common format such as but not limited to a single text encoding format, e.g., UTF-8, so that final results of converted data may be aggregated and returned in a single SQL query. It is to be understood that any other character encoding performed by the server, such as ASCII or ISO8859 may also be used without moving out from the scope of the disclosed embodiments. Additionally and/or alternatively, the records of at least one table per dataset must be annotated with a unique vertex ID that may also be used in a graph analysis portion of the data records integration process to link and track data. Because the graphical analysis is part of the record linkage server, utilizing the veritex removes the restriction that the contraction must occur over vertices sharing an incident edge. The operation may occur on any pair (or subset) of vertices in the graph.

In some embodiments, the vertex ID may be generated at the beginning of the data records integration process. Accordingly, the preprocessing process 300 portion of the data records integration process used to compute the vertex IDs may be idempotent, enabling different steps in the process to follow the same id generation process to produce verifiably consistent vertex IDs for each record. This enables the output from separate steps of the preprocessing process 300 to be joined by the vertex ID attribute, a component used in the graphical analysis.

Figure 3B:
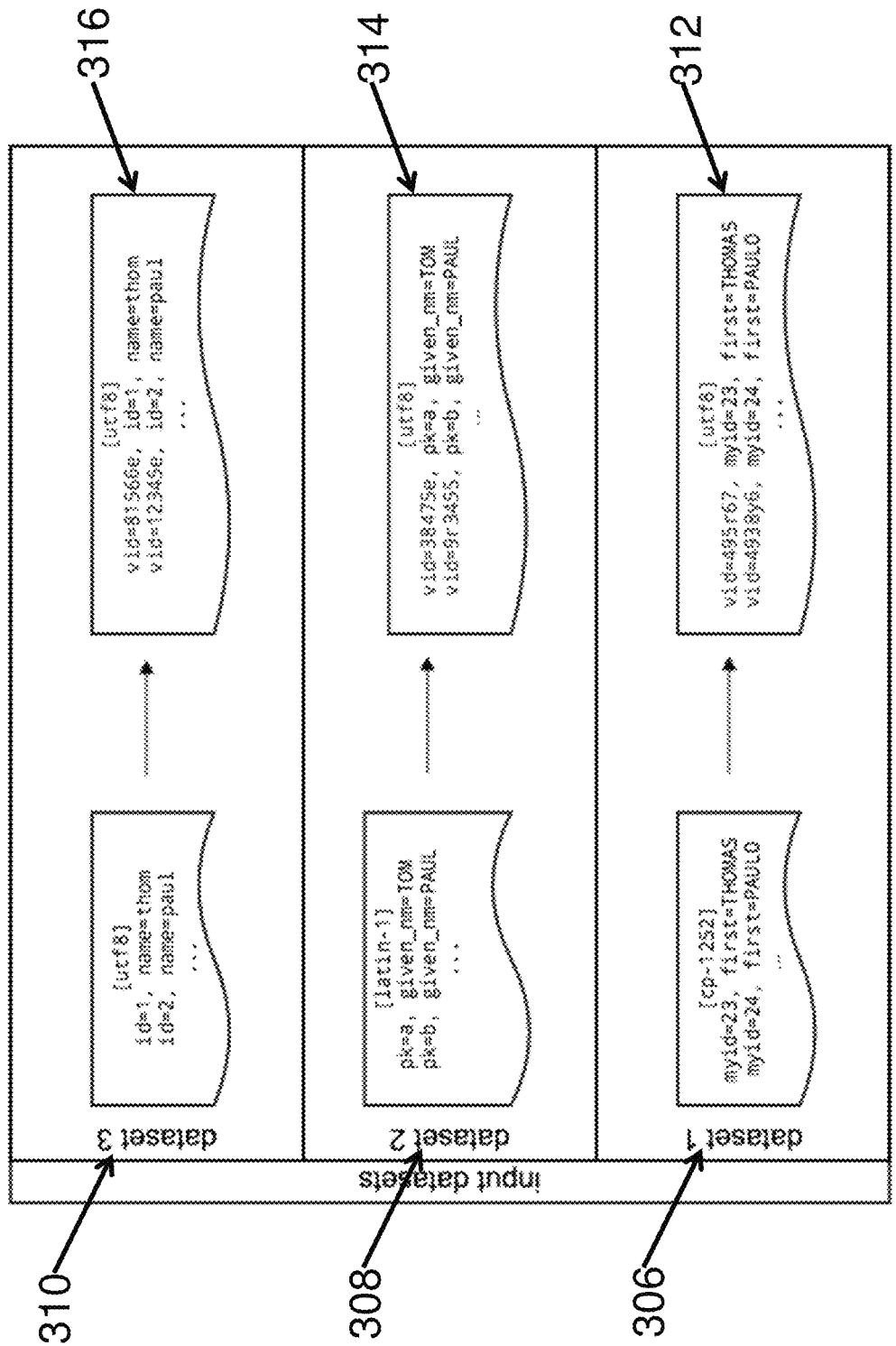
FIG. 3B illustrates a flow diagram showing preprocessing process executed by a server of data records integration system, according to an exemplary embodiment.

A demonstration of the two steps of the preprocessing process 300 is shown in FIG. 3B. As seen in FIG. 3B, data sets 306, 308, and 310 may come from different databases (such as databases 102 and 104 of FIG. 1A) and may represent different datasets. A first data set 306 may use a coding technique such as but not limited to CP-1252 encoding to encode the data for the id and first name. A second data set 308 may use a coding technique such as but not limited to latin-1 encoding to encode a Pk and a give_nm field and a third data set 310 may use a coding technique such as but not limited to utf-8 encoding to encode an id and name field. On application of the preprocessing module of the server, on the data sets 306, 308, and 310 that may come from different databases (such as databases 102 and 104 of FIG. 1A), FIG. 3B shows outputs 312-316 of the character conversion of their respective data sets 306, 308, and 310. After the execution of the character conversion process by the server, data in all of the data sets 306, 308, and 310 is converted to a common character format, for example, in this embodiment, utf-8 and the original fields may have been maintained. Additionally, veritex IDs (vid) may have been assigned to each entry.

After formats of the datasets are converted, the datasets/records in databases (such as databases 102 and 104 of FIG. 1A) may undergo a schema normalization, in which semantically equivalent fields are identified, so that a blocking function of the database integration process may uniformly access attributes from each record without regard to idiosyncrasies of column naming in each dataset. In some embodiments, the schema normalization may be executed by the server, by manually establishing a mapping of master schema fields to their equivalent fields in each dataset of the databases (such as databases 102 and 104 of FIG. 1A). In some embodiments, a mapping function may be generated and used by the server, to relate fields in the datasets based on a set of predetermined rules. At a minimum, a master schema may specify translations for any fields of the datasets implicated in either a blocking or a pairwise comparison steps of the database integration process; any fields not required for either of those two steps may simply be ignored.

FIGS. 3C and 3D are examples of an implementation preprocessing process executed by a server of data records integration system, according to an exemplary embodiment. FIG. 3C and FIG. 3D will be explained in conjunction with FIG. 1A to FIG. 3B and illustrates final steps of the preprocessing process of the database integration process. In FIG. 3C, a master schema mapping for two fields of a dataset, namely, dataset_id 318 and first name 320 is shown. As illustrated in the FIG. 3C, field ids from the data sets 306, 308, and 310 may be mapped to dataset_id field 402. For instance, field id from the dataset 302, pk from dataset 308 and myid from dataset 310 may be mapped to dataset_id field 318. Similarly, fields "name", "given_nm" and "first" may be mapped to filed "firstname" 320.

In FIG. 3D, records 322 of a dataset with a unified character conversion and an associated vid are illustrated. The schema normalized records 324 may maintain the vid, and assign normalized data fields to dataset_id 318 and firstname 320 such that all the fields from the data sets 306, 308, and 310 are now associated with a same data field.

The server completes the preprocessing of the datasets when schema normalized fields/records 324 are generated. Subsequently, the server execute a blocking module (such as the blocking module 204 of FIG. 1A). The execution of the blocking module reduce the general problem of probabilistic linkage from requiring n2 pairwise comparisons between records of the datasets, where n is the total number of records in all input datasets. Also, the execution of the blocking module further facilitates requirement for a much smaller number of pairwise comparisons. In some embodiments, the records of the datasets are first separated by the server into groups by executing a blocking function by the server that produces a hashable value for each record, and then pairwise comparisons are performed by the server only among the records within each group.

Figure 4:
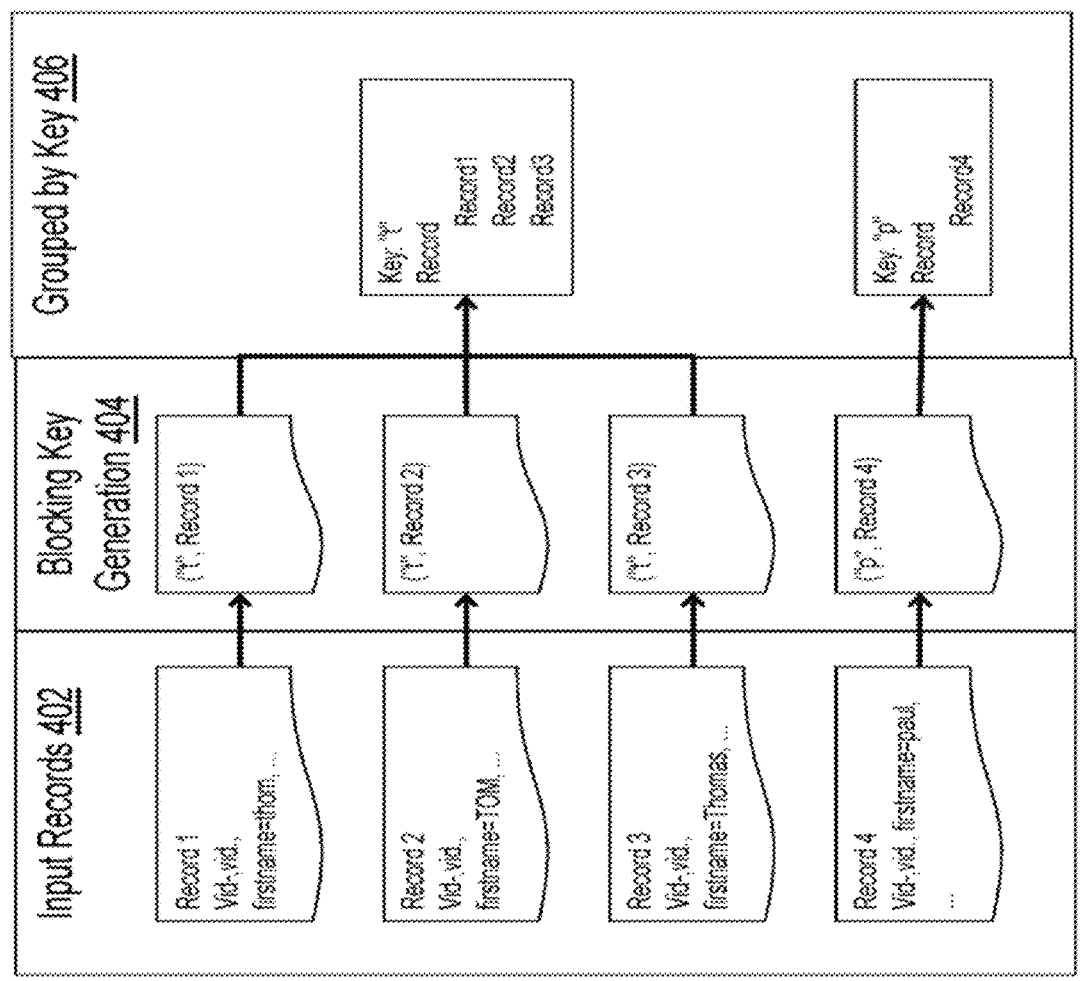
FIG. 4 illustrates blocking process executed by a server of data records integration system, according to an exemplary embodiment.

With the schema normalized fields available after the execution of preprocessing module by the server, the implementation of the blocking step by the server is executed by combining the normalized records, and then grouped by an output of a function that returns a blocking key used to facilitate a by-key aggregation capable of running in linear time on a cluster-computing system, designed to parallelize computationally expensive operations over large amounts of data such as Apache Spark. One example of blocking function executed by the server is illustrated in FIG. 4. For instance, the server selects a function that returns a first character of a "firstname" master schema field 402 as a lowercase letter. As seen in the FIG. 4, the first letter of the field first name are all converted to lower case. Once the conversion is implemented by the server, the resultant records are then grouped by the key, in this example case, the first letter of the firstname field. In this manner, all records are effectively grouped by a common reference by the server, for example, the first letter of each person's first name. As seen in the FIG. 4, the blocking key generation 404 by the server identifies all records where the key is the same. The records are then grouped by this blocking key 406.

In some embodiments, the criteria used during the execution of the blocking module by the server may have significant implications for the record linkages created as a whole. For example, records of the datasets initially separated into different blocks by the server are presumptively unrelated for the remainder of the database integration process. Accordingly, blocking criteria used by the server must be broad enough to avoid precluding a match between related but different records of the datasets.

Figure 5:
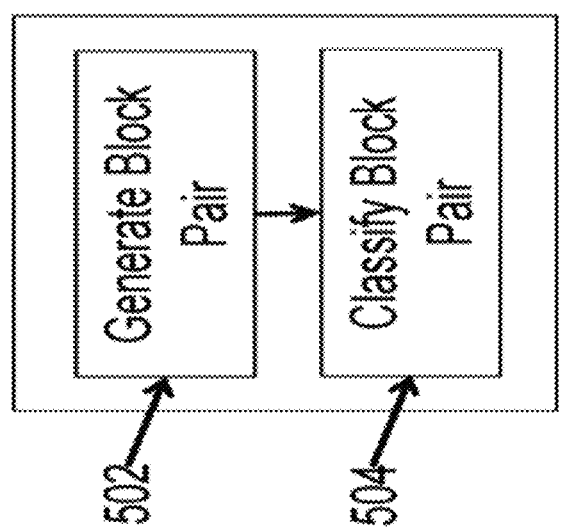
FIG. 5 illustrates classification process executed by a server of data records integration system, according to an exemplary embodiment.

Once the records of the datasets have been grouped into blocks by the server, the server executes a classification module (such as the classification module 206 of FIG. 2). The steps of the execution of the classification module by the server are illustrated in FIG. 5. The classification of the datasets by the server may include generation of block pair generation 502 and the classification of block pair 504. For instance, the records within each block of the dataset may be compared on a pairwise basis by the server to determine which records are probabilistically related. As a first step 502 in the classification process being executed by the server, each block may be transformed into a collection of record pairs by the server. Starting with blocks comprising records by the server, 1-n the collection of record pairs may be compiled by the server. For example, block (Record1, Record2, Record3, . . . , Record N) may result in pairs ([(Record1, Record2), (Record1, Record3), . . . , (Record1, RecordN), (Record2, Record3), . . . (Record(N−1), Record N]).

In some embodiments, portion of the classification step being executed by the server may be computationally intensive. For instance, the number of pairs may be exponentially related to the size of each block. The complexity of this classification step being executed by the server may be bounded by imposing a maximum allowable block size and dropping any blocks that exceed it. It will be understood by one skilled in the art, that dropping blocks by the server is done with care, because doing so by the server may preclude any possibility of a linkage between records in the dropped blocks later in the process. This is because the block pair classification by the server may be confined to pairs within blocks.

In some embodiments, to generate block pairs, the server may utilize tools including but not limited to Python's itertools, combinations function, which allows for reasonably efficient memory usage because such tools may generate combinations of references to the record objects without actually copying them. In some embodiments, such tools may be implemented in ANSI C.

The server after generating block pairs, then determines if the classifiable pairs are matching or not matching (related or unrelated). In some embodiments, the server may classify the block pairs 504 by executing a classification method in which each pair may be deemed related solely on based on a strength of a string similarity contained within a field, such as each person's name. As a matter of implementation, in some embodiments, a floating-point ratio may be computed by the server indicating a string similarity of the criteria in each record and then classifying any pair with a score higher than a set threshold as a match. In some embodiments, any probability exceeding a threshold of 0.8 may be deemed by the server a match whereas any probability below a set threshold may be deemed by the server not to be a match.

Table 1 illustrates a simple example of determining if the classifiable pairs are matching or not matching using the dataset firstname 320 from FIG. 3C and a match threshold of 0.8.

TABLE 1

| Pair | Hash Values | Score | Classification |
| --- | --- | --- | --- |
| (Record1, Record2) | ("thorn", "TOM") | 0.8571428571428571 | MATCH |
| (Record1, Record3) | ("thorn", "THOMAS") | 0.8 | MATCH |
| (Record2, Record3) | ("TOM", "THOMAS") | 0.6666666666666666 | NO MATCH |

In some embodiments, once all the pairs in each block are classified by the server, the server may proceed to analyze the classified pairs utilizing a graphical interface to determine which groups of scored pairs are related. The server may analyze the classified block pairs as a graph structure in order to cluster the linked records into groups representing distinct entities. As explained above, the data may be pre-processed by the server, normalized by the server according to a master schema, coarsely blocked by the server in order to limit the computational complexity of pairwise comparisons, and combined into record pairs and finally classified by the server.

Once the block pairs of the dataset are classified by the server, in some embodiments, the pairs may be transformed into a graph by the server that can be processed on a large scale using a distributed graph analysis utility, such as but not limited to Spark's GraphX. GraphX may be a distributed graph processing framework on top of Spark. The GraphX may provide an API for expressing graph computation that may model abstractions.

Figure 6:
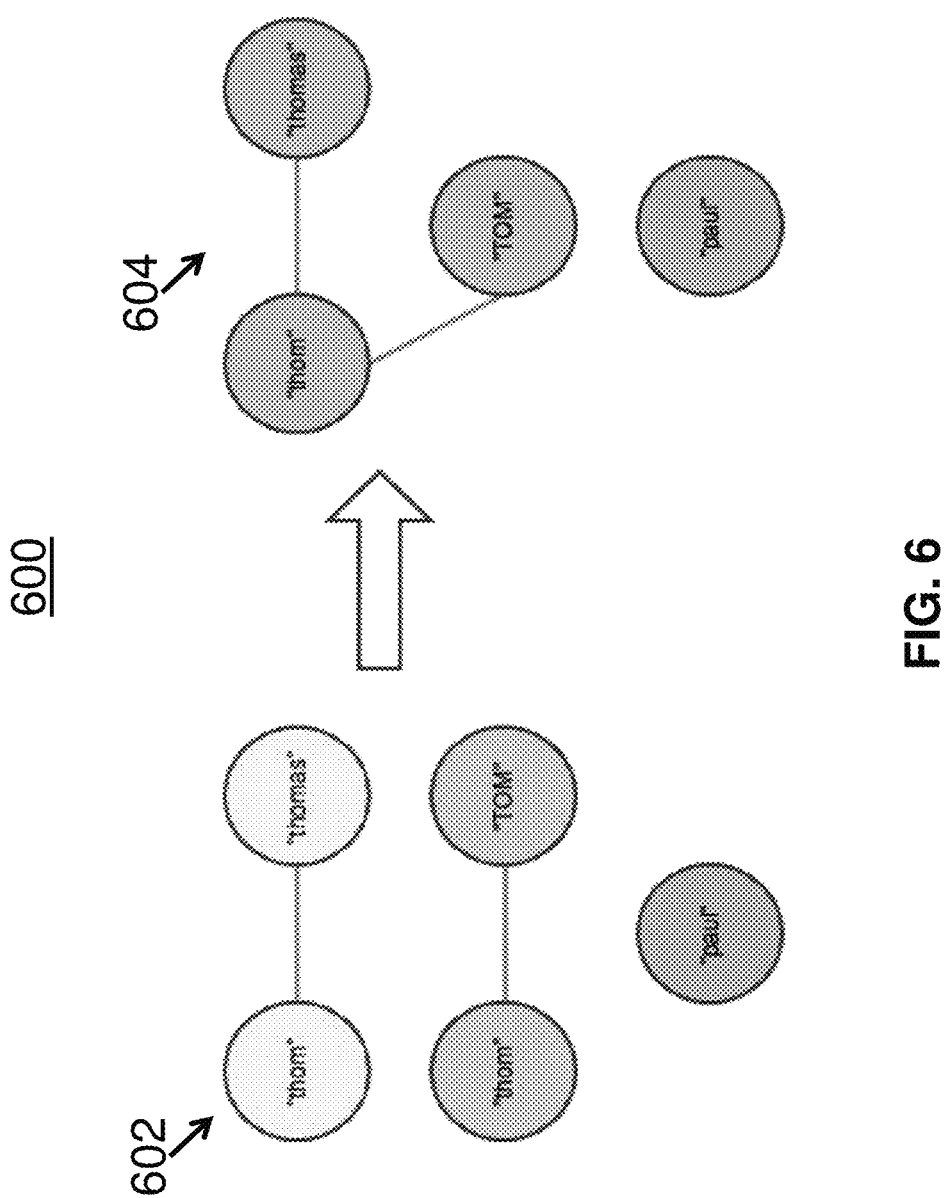
FIG. 6 illustrates graph analysis process executed by a server of data records integration system, according to an exemplary embodiment.

The purpose of the graph analysis step in the database integration process is to address a problem that may arise once the block pairs are classified by the server. For example, if record1 matches record2 but not record3, how should the server handle the fact that record2 matches record3. As illustrated in FIG. 6, when "thorn" matches "Thomas" and "thorn" matches "TOM" but there is no recognized relationship between "thomas" and "TOM". On the left side 602 of the FIG. 6, the matched pair connections before the graph analysis step are shown. The right side 604 of the FIG. 6 shows the connected components after the graph analysis step is executed by the server, with "TOM" and "thomas" as members of the same entity, even though they weren't matched during the pairwise classification step. In some embodiments, the graph analysis step executed by the server implements by locating transitively connected clusters of records of the datasets and assigning each cluster a distinct ID that represents a single entity with which all connected records are related.

In order for the server to perform the cluster analysis, the results of the pairwise classifications may be transformed into a graph by the server where the graph is consisting of 1) a set of vertices, each of which must be represented as a unique long integer, and 2) a set of edges of the form (vertex_id2, vertex_id2).

Figure 7:
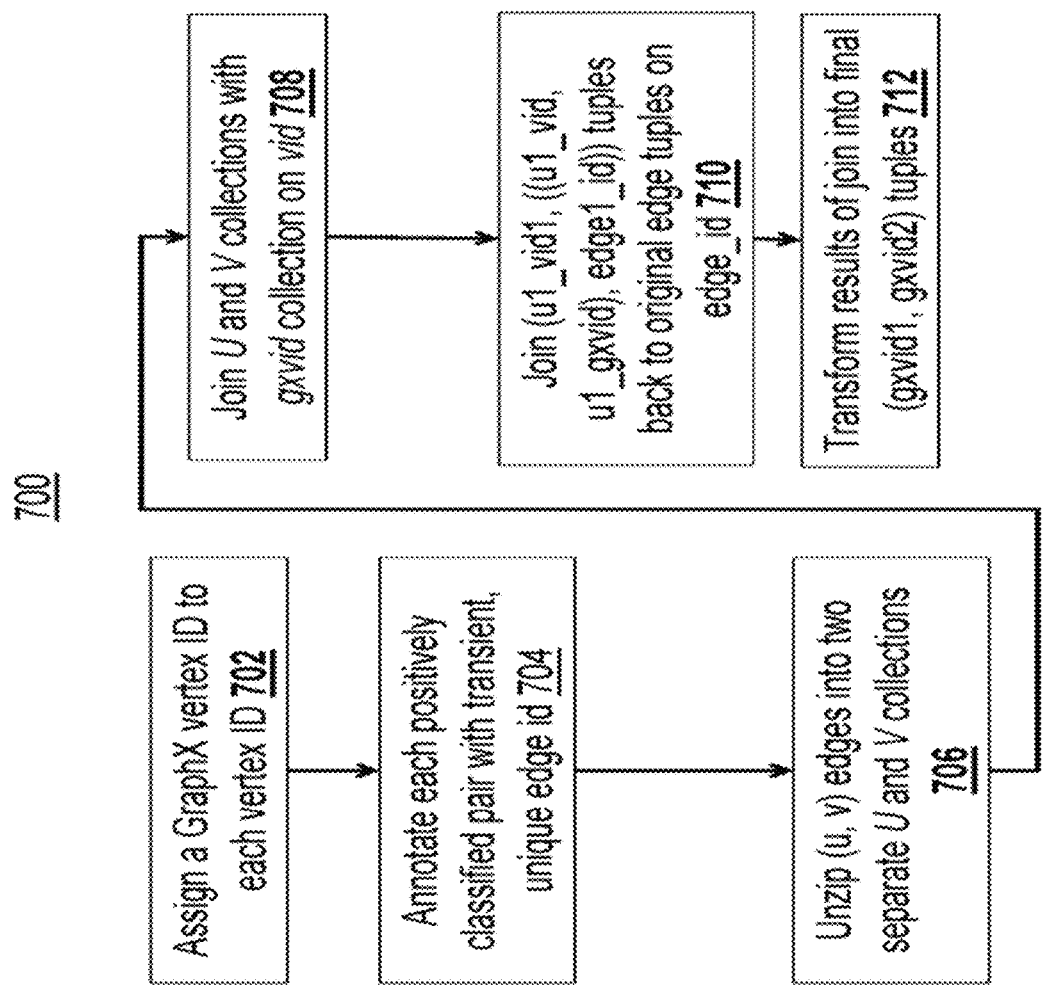
FIG. 7 is a flow diagram showing generation of a graph executed by a server of data records integration system, according to an exemplary embodiment.

FIG. 7 is a flow diagram 700 showing generation of a graph in the database integration process. The steps of the flow diagram 700 are required to convert the existing record and classified pair data into a GraphX graph.

At step 702, a GraphX vertex ID is assigned by a server to each vertex ID. As explained above, each record was assigned a unique vertex ID by the server created by calculating an MD5 hexdigest based on the records contents. Because GraphX requires vertex IDs to be long integers and the unique vertex IDs are strings, first a unique long integer for each vertex ID must be generated by the server. This is done by the server by calling and running an application such as RDD.zipwithuniqueId on each vertex ID collection. The server must also maintain a persistent (vid, gxvid) mapping in order to preserve the ability to join the results of the GraphX computations back onto the input data later on, so those results have to be temporarily written back into a distributed file such as HDFS. In some embodiments, a Hadoop Distributed File System (HDFS) may be used. HDFS may be designed to run on standard hardware such as computing devices. It has many similarities with other distributed file systems, however, the differences from other distributed file systems are significant. For example, HDFS is highly fault-tolerant and is designed to be deployed on low-cost hardware. The HDFS may also provide high throughput access to application data and is suitable for applications that have large data sets.

As used here in, "vid" is the unique vertex ID created by the server by hashing the contents of the record. "gxvid" is the GraphX vertex id. In some embodiments, this is a long integer mapped to the hash-derived vid, and this results in Rdd([vid1, vid2, vid3, . . . ])→Rdd(R[(vid1, gxvid2), (vid2, gxvid3), . . . ]).

At step 704, each positively classified pair may be annotated by the server with a transient unique edge id where the edge id is a long integer associated with each edge of the form (vid1, vid2). This process is repeated with the edges, which consist of hash-derived vid's. The edge ids are only generated to facilitate converting the edge from (u_vid, v_vid) tuples into (u_gxvid, v_gxvid) tuples. Yielding Rdd ([(u_vid, v_vid), (u_vid, v_vid), . . . ])→Rdd([(eid, (u_vid, v_vid)), . . . ]).

At step 706, the (u,v) edges are unzipped by the server into two separate U and V collections. In some embodiments, "u" and "v" may be used to indicate the out-bound and in-bound vertices in directed graph edges. Even though the graph is technically undirected, "u" and "v" may be used to differentiate the right and left vertices in each edge.

The edges are unzipped into two collections by the server, one containing (u_vid, edge_id) pairs and the other containing (v_id, edge_id) pairs. Where u_vid (and v_vid) are used to indicate the vid associated with edge vertices u and v, respectively. In an embodiment, this may result in a U and V pair defined as:

$$U=[(edge\_id,(u\_vid,v\_vid)), \ldots ]\to[(u1\_vid, edge1\_id),(u2\_vid,edge2\_id), \ldots ]$$

$$V=[(edge\_id,(u\_vid,v\_vid)), \ldots ]\to[(v1\_vid, edge1\_id),(v2\_vid,edge2\_id), \ldots ]$$

At step 708, the U and V collections are joined by the server with the gxvid collection on the vid. In some embodiments, this yields pairs:

$$[(u1\_vid,edge1\_id),(u1\_vid2,edge1\_id), \ldots ]\to [(u1\_vid,((u1\_vid,u1\_gxvid),edge1\_id)), \ldots ]$$

$$[(v1\_vid,edge1\_id),(v1\_vid2,edge1\_id), \ldots ]\to [(v1\_vid,((v1\_vid,v1\_gxvid),edge1\_id)), \ldots ]$$

where u_gxvid and v_gxvid indicate the gxvid associated with edge vertices u and v, respectively.

At step 710, the (u1_vid1, ((u1_vid, u1_gxvid), edge1_id)) tuples are joined back by the server to the original edge tuples on the edge_id yielding, in an embodiment, [(u1_vid, ((u1_vid, u1_gxvid), edge1_id)), . . . ]→[(edge1_id, ((u1_vid, u1_gxvid), (v1_vid, v1_gxvid))), . . . ].

Finally, at step 712, the results of the join are transformed by the server into the final (gxvid1, gxvid2) tuples. In some embodiments, this can be represented as [(edge1_id, ((u1_vid, u1_gxvid), (v1_vid, v1_gxvid))), . . . ]→[(u1_gxvid1, v1_gxvid), (u2_gxvid, v2_gxvid). Once all of the records have been assigned long integer values gxvid's required by GraphX and saved, mapping between the internal, hash-derived vid's and the gxvid's, can now pass to GraphX to compute the connected components of the resultant graph.

Once process 700 may be completed, the server computes the connected components using a graphical application such as but not limited to GraphX. With the edges written out to HDFS or a similar distributed file system, in a format that GraphX can understand, the server may compute the connected components with a fairly simple GraphX job. The job iteratively derives the connected components and writes the results back into HDFS or a similar distributed files system, as (gxvid, component_id) pairs.

With the (gxvid, component_id) mapping obtained from GraphX, all that remains is to load the persisted (vid, gxvid) mapping generated and to join it with the (gxvid, component_id) set by the server. Each record must be annotated by the server in the union of the input records with its corresponding component_id. Next, all the original, input datasets can be written out by the server to HDFS, with each record annotated with its component_id. The collection of component_id's must also be written to HDFS as the basis of the database table linking all the input records. Finally, all the tables can be loaded by the server for querying, into cluster-based, column-oriented analytics platform such as HP's Vertica platform which may be designed to manage large, fast-growing volumes of data and provide very fast query performance when used for data warehouses and other query-intensive applications.

In some embodiments, the following procedure was used by the server to complete the methods described herein. The raw data was loaded into the server. Inputs were saved in HDFS via the various ingestion processes, which do not alter the underlying data. While some changes to the initial data may take place upon loading, such as format changes, they are minor and the data should still be considered "raw" data. Next, data may be parsed by the server if necessary to prepare it for normalization. The "raw" data is normalized using rows from each dataset and transforming each row into a new object with uniform field names. Next, each row may be associated with its respective dataset name, i.e., row1, row2, row3, . . . ]→[(dataset1, row1), (dataset1, row2), . . . ].

Once the fields have been subject to normalization by the server and applied to the master schema by the server, each record is annotated by the server with its dataset name, and all records are joined together by the server into a single RDD. This creates a single RDD in preparation for blocking. The normalized master schema data needs to be repartitioned. The unionized RDD data set is likely to contain partitions with widely varying sizes, which can cause memory and other issues with more costly operations later in the job. In some embodiments, the solution was to repartition immediately after unionization. Next, the joined data is grouped by function which extracts the blocking features. In some embodiments, the blocking feature was simply the "lastname" master schema field. In other embodiments, the blocking might be loosely blocked on broad traits so as not to preclude possibly related records from ending up in the same block. If blocking is too specific, potential matches are total lost before there is even a chance to score them.

Blocks that have a large number of corresponding values may cause serious computational problems. For example, if group by "lastname" is used for more than 2,000,000 records and there are considerable number of records without a data entry in that field, then the executor trying to group those records will likely exceed memory allotment and the process may be stopped. The solution is to comprehensively scrub bad values from the dataset. Once the number of valid data blocks is known, the system may compute the combinations. Specifically, given the number of blocks, the next step is to compute the pairs of records within each block, which will be performing pairwise comparisons. In some embodiments, this was done using an itertools.combination function.

Alternatively, in some embodiments, a simpler way to compute block pairs is to use an application such as Spark running an application to determine the functional abstractions. Once the blocks are computed by the server, the pairs are passed to a function that gives a thumbs up/down as to whether the two records are related. This comparison by the server may be a simple string similarity metric or any other thresholding algorithm. The next major step of the process by the server is to load all the documents into a undirected graph and compute the connected components.

In some embodiments, vertices next need to be generated by the server. This addresses the transitivity issue of records deemed related during the classification step, where (A is related to B) and (B is related to C) but (A is not related to C). After this step, (A, B, C) will form a single connected component. The first step towards generating such a graph by the server is to generate a set of vertices that compose the graph. Both the records contained in the pairs deemed as linked during the classification step are needed and the pairs that were not classified as being linked are also needed. The resulting graph generated by the server contains exactly one vertex for every record in the unioned data, i.e., the needed and not needed. In some embodiments, this presents a challenge, because in order to use graph processing libraries, the server needs a ID for each vertex.

In some embodiments, a MD5 hexdigest of the string consisting of "{dataset_name}-{dataset_id}" may be used and converted from Base16 into an integer. Next to generate the graph edges, pairs of vertex IDs are written out by the server, but only for pairs that are classified as being related. The connected components are then calculated by the server and joined to the data. The next step in the process by the server is to produce csv files that can be imported as tables into an application such as Vertica. To do this, each record in the raw datasets must be annotated by the server with the component_id, if any, that was assigned to its group of linked records. This may be done by taking the unionized set of normalized records computed earlier and join it with the connected component output, which includes the vertex id of each record in each component. Prior to this however, the RDDS need to be transformed by the server to have vertex IDs as the keys for each item. This may be done is several steps.

First, the connected components output may be transformed by the server with a simple flatmap operation: [(cid1, [vid1, vid2]), [cid2, (vid3, vid4, vid5)]]→[(vid1, cid1), (vid2, cid1), (vid3, cid2), . . . ]. Next, the unioned/normalized data must be transformed by the server in a similar way:

[(dataset_name1, record1), (dataset_name2, record2), . . . ]→[(vid1, (dataset_name1, record1), (vid2, (dataset_name2, record2), . . . ]. In some embodiments, a simple inner join may be used. This should be sufficient, as long as the graph created during the connected components step properly included all vertices (from both matched and unmatched pairs), such that the set of vertex IDs found in the connected components output and the vertex IDs generated for the raw data should be identical. Note, however, that such a step requires a re-computation of the vertex ID of every record after re-loading the raw data. This may be avoided using a pipe method, which would enable a single job to keep the raw records in memory and use them again later.

Next, each record must be augmented by the server with its respective component id. In some embodiments, each record's vertex ID and dataset_ID was also added. This may result in a record such as [(cid1, (dataset_name1, record1), (cid1, (dataset_name1, record1), . . . (cidN, (dataset_nameN, recordN)]. The records are then regrouped by the server based on the dataset_name. In some embodiments, the records were grouped by the server by dataset_name, which will give separate RDDs of records equivalent to a vertica table import for each dataset. An alternative approach may be to iteratively filter the unioned RDD by each key and write out the tables in HDFS directly from Spark.

Finally, the json lines for each table are exported by the server to CSV. This can be done in a memory by the server by creating a unicodecsv.DictWriter and mapping it over the partitions of distinct objects representing each row. This may result in avoiding the python/csv complexity and the use of the stream approach with a fast go binary (github (https://github.com/jehiah/json2csv)). Lastly, the tables need to be loaded into Vertica by the server so that they may be queried as a whole single table.

In some embodiments, the records that weren't linked with at least one other record during the classification stage were dropped, thereby reducing the total number of records loaded into Vertica. In some embodiments, all connected components graph may be constructed exclusively from positively classified edges, whereas it should actually be constructed from all vertices, then have the positively classified edges added. This prevents unmatched records from getting dropped.

In some embodiments, the server generated unique IDs based on an MD5 hexdigest of each record's contents, which eliminated the problem of different records accidentally sharing an ID. Instead of stopping a job to stream the edge/vertices through a separate Python process, the system may either ".collect" all the necessary points and construct the graph in a driver, or pipe the data to a subprocess using RDD.pipe so that the Spark job can still continue afterwards without reloading and re-computing all the data a second time.

In some embodiments, instead of piping the unioned data to a Python script to split the files manually in a single process, the data may be iteratively filtered and write out the records for each dataset, which parallelizes the I/O so things won't be slow when large data sets are included.

The foregoing method descriptions and the interface configuration are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined here may be applied to other embodiments without departing from the spirit or scope of the invention. Thus, the present invention is not intended to be limited to the embodiments shown here but is to be accorded the widest scope consistent with the following claims and the principles and novel features disclosed here.

What is claimed is:

1. A server-implemented method comprising:
   preprocessing, by a server, a plurality of datasets by converting the plurality of datasets in a plurality of data formats to the plurality of datasets having a common format;
   grouping, by the server, the plurality of datasets into one or more pairs based on one or more blocking keys associated with each dataset, wherein each dataset has a blocking key configured to generate hash values for each dataset based on content of each dataset;
   determining, by the server, a score for each pair based on the hash values for each respective dataset in the one or more pairs;
   classifying, by the server, each pair based on the score computed for the pair satisfying a predetermined threshold, wherein the server is configured to link datasets of the plurality of datasets within a same classification;
   generating, by the server, based on respective edge identifiers generated for each of the one or more pairs according to the classification of the one or more pairs, a graph structure representing a cluster of linked datasets within the plurality of datasets that are determined to be related to each other, wherein the graph structure is generated based on a join operation performed according to the respective edge identifiers generated for each of the one or more pairs; and in response to receiving a request to search a data record from a computing device of a user, querying, by the server, the cluster of linked datasets to search the data record.

2. The server-implemented method of claim 1, wherein the plurality of datasets are arranged in a plurality of fields.

3. The server-implemented method of claim 2, further comprising assigning, by the server, a unique identifier to each field associated with the plurality of datasets.

4. The server-implemented method of claim 3, wherein the plurality of fields are mapped to a common set of fields selected from a library of fields.

5. The server-implemented method of claim 1, wherein each of the plurality of datasets has a dataset_name.

6. The server-implemented method of claim 1, wherein the common format is a single text encoding format.

7. The server-implemented method of claim 1, further comprising normalizing, by the server, each of the plurality of datasets.

8. The server-implemented method of claim 7, wherein normalization is performed by executing a master schema.

9. The server-implemented method of claim 8, wherein the master schema is configured to identify each semantically equivalent field associated with each of the plurality of datasets.

10. The server-implemented method of claim 1, wherein the score is a floating-point ratio computed based on the hash values associated with each dataset within each pair.

11. A system comprising:
a server configured to:
preprocess a plurality of datasets by converting the plurality of datasets in a plurality of data formats to the plurality of datasets having a common format;
group the plurality of datasets into one or more pairs based on one or more blocking keys associated with each dataset, wherein each dataset has a blocking key configured to generate hash values for each dataset based on content of each dataset;
determine a score for each pair based on the hash values for each respective dataset in the one or more pairs;
classify each pair based on the score computed for the pair satisfying a predetermined threshold, wherein the server is configured to link datasets of the plurality of datasets within a same classification;
generate, based on respective edge identifiers generated for each of the one or more pairs according to the classification of the one or more pairs, a graph structure representing a cluster of linked datasets within the plurality of datasets that are determined to be related to each other, wherein the graph structure is generated based on a join operation performed according to the respective edge identifiers generated for each of the one or more pairs; and
in response to receiving a request to search a data record from a computing device of a user, query the cluster of linked datasets to search the data record.

12. The system of claim 11, wherein the plurality of datasets are arranged in a plurality of fields.

13. The system of claim 12, wherein the server is further configured to assign a unique identifier to each field associated with the plurality of datasets.

14. The system of claim 13, wherein the plurality of fields are mapped to a common set of fields selected from a library of fields.

15. The system of claim 11, wherein each of the plurality of datasets has a dataset name.

16. The system of claim 11, wherein the common format is a single text encoding format.

17. The system of claim 11, wherein the server is further configured to normalize each of the plurality of datasets.

18. The system of claim 17, wherein normalization is performed by executing a master schema.

19. The system of claim 18, wherein the master schema is configured to identify each semantically equivalent field associated with each of the plurality of datasets.

20. The system of claim 11, wherein the score is a floating-point ratio computed based on the hash values associated with each dataset within each pair.

* * * * *